(12) United States Patent
Lu et al.

(10) Patent No.: US 7,705,086 B2
(45) Date of Patent: Apr. 27, 2010

(54) ROOM TEMPERATURE CURABLE WATER-BASED MOLD RELEASE AGENT FOR COMPOSITE MATERIALS

(75) Inventors: Zheng Lu, Brentwood, NH (US); Randy Lee Smith, New Fields, NH (US)

(73) Assignee: Henkel Corporation, Rocky Hill, CT (US)

( * ) Notice: Subject to any disclaimer, the term of this patent is extended or adjusted under 35 U.S.C. 154(b) by 609 days.

(21) Appl. No.: 10/522,842

(22) PCT Filed: Oct. 3, 2003

(86) PCT No.: PCT/US03/31289

§ 371 (c)(1),
(2), (4) Date: Jan. 28, 2005

(87) PCT Pub. No.: WO2004/033172

PCT Pub. Date: Apr. 22, 2004

(65) Prior Publication Data

US 2006/0074159 A1 Apr. 6, 2006

(51) Int. Cl.
*C08L 83/04* (2006.01)
(52) U.S. Cl. .............................. 524/588; 516/53; 528/34
(58) Field of Classification Search ................ 524/588; 516/53; 528/34
See application file for complete search history.

(56) References Cited

U.S. PATENT DOCUMENTS

| 2,891,920 | A | * | 6/1959 | Hyde et al. ................ 524/714 |
| 5,219,925 | A | | 6/1993 | Stephens .................... 524/860 |
| 5,298,556 | A | | 3/1994 | Stephens .................... 524/860 |
| 5,399,310 | A | | 3/1995 | Payne et al. ................. 264/338 |
| 5,431,832 | A | | 7/1995 | Crowe et al. |
| 5,464,586 | A | * | 11/1995 | Wagner ....................... 264/130 |
| 5,601,641 | A | | 2/1997 | Stephens .................. 106/38.25 |
| 5,861,458 | A | * | 1/1999 | Naganawa et al. .......... 524/837 |
| 5,916,939 | A | | 6/1999 | Gillis et al. .................. 524/218 |
| 5,985,994 | A | * | 11/1999 | Oberneder et al. .......... 524/864 |
| 6,294,007 | B1 | * | 9/2001 | Martin ..................... 106/38.22 |
| 6,322,850 | B1 | | 11/2001 | Stephens et al. ............. 427/133 |
| 6,825,153 | B2 | * | 11/2004 | Giraud et al. ................ 508/208 |
| 2003/0114321 | A1 | | 6/2003 | Giraud et al. |

FOREIGN PATENT DOCUMENTS

| DE | 4231184 A1 | | 3/1994 |
| JP | 08-085760 | | 4/1996 |
| JP | 11-335509 | | 12/1999 |
| JP | 11-349774 | | 12/1999 |
| JP | 2000-191786 | | 7/2000 |
| WO | 01/40417 | * | 6/2001 |

OTHER PUBLICATIONS

Silicones, Freeman, London-Iliffe Books, Ltd. (1962) p. 27.*

* cited by examiner

*Primary Examiner*—Kuo-Liang Peng
(74) *Attorney, Agent, or Firm*—James E. Piotrowski; Steven C. Bauman

(57) ABSTRACT

A room temperature curable water-based mold release agent that is useful for demolding composite parts, such as epoxy and polyester based polymer materials. The mold release agent is curable at low temperatures, such as room temperature, but is thermally stable up to conventional epoxy based composite molding temperatures, e.g., greater than 200 or 280° C. The mold release agent is useful for demolding large composite parts that are cured in large ovens at high temperature when the molds themselves are prepped at room temperature before placing in the oven. The mold release agent is also useful for demolding polyester composite parts that are prepared and cured at low temperature such as room temperature.

18 Claims, No Drawings

ROOM TEMPERATURE CURABLE WATER-BASED MOLD RELEASE AGENT FOR COMPOSITE MATERIALS

BACKGROUND OF THE INVENTION

The present invention relates to mold release agents. More particularly, it relates to a semi-permanent water-based mold release agent for composite materials.

Molding is a well known technique for producing finished parts made from composite materials such as graphite-containing materials or fiber reinforced polyester materials and the like. Molded graphite-containing composite parts are particularly prevalent in the aerospace industry. For example, many airplane hulls (i.e. fuselage and wings) are constructed from a multitude of molded composite parts that are subsequently bonded together using an adhesive.

Typically, layers of fiber-mat material that have been impregnated with a liquid epoxy resin composite (such as prepreg plies) are laid down to conform to the shape of a mold. The mold is then heated to elevated temperature (e.g. 100-200° C.) to cure the liquid resin composite and provide the finished part. After the mold has cooled, the finished molded composite part is removed and the mold may be used again. In order to prevent the finished molded part from sticking or adhering to the mold surface, a mold release agent is applied to the mold surface prior to applying the prepreg plies to the mold. This process is well known in the art. It is important for molded composite parts that they can be demolded gently, using minimal force because, especially for the aerospace industry, the parts often are quite large and delicate. This means the mold release agent must provide superior release characteristics.

In certain applications, particularly when molding very large parts such as airplane wings, the molds are prepped at room or ambient temperature, and then inserted into very large ovens to cure the liquid resin to form the finished molded part. Consequently, the molds themselves, which are quite large, are not equipped with any heating equipment. This means that the mold release agent applied to the mold surface at room temperature must also be curable at room temperature in a relatively short period of time, such as a few hours. Otherwise, if one had to place the mold in the large ovens to cure the mold release agent, much time, effort and productivity would be lost. Once the mold release agent has cured at room temperature, it must still withstand the high temperatures (e.g. up to 300-400° C.) necessary to subsequently cure and form the molded parts.

Fiber reinforced polyester (FRP) parts are generally molded at around ambient temperature (10-70° C.). Most of FRP parts require a high gloss finish. This has been achieved by using the conventional and well known Frekote™ brand (available from Henkel Loctite) solvent-based semi-permanent mold release agents. However, certain FRP releases require their parts to have a matte finish or to have no transfer of mold release agent to the molded parts, such as "sanding gelcoat". Conventional water based mold release agent such silicones and waxes are useful to release PRP parts but result in detrimental transfer of the mold release agent to the molded parts. Commonly used solvent based semi-permanent mold release agents are popular in the market place but do not provide a matte finish on the released parts. Solvent based release agents also contain hazardous VOCS.

There are two basic types of mold release agent, sacrificial and semi-permanent. A sacrificial mold release agent is one that is consumed or otherwise completely depleted after a single molded part is made in the mold. Known sacrificial mold release agents include natural and synthetic compounds such as silicone oils, mineral oils, waxes, fatty acid derivatives, glycols, etc. Sacrificial mold release agents must be constantly reapplied to the mold surface prior to making each molded part. For this reason, sacrificial mold release agents are costly and cumbersome to use. Also, molded composite parts are usually post bonded (adhered to other composite parts using an adhesive). Transfers of sacrificial release material will affect the bonding ability of the adhesive. Hence, sacrificial mold release agents are not suitable for molding many composite parts, particularly for aerospace applications.

Semi-permanent mold release agents are also applied to the mold surface. They can be of the wipe-on or spray-on type. These release agents are preferred because they are not completely depleted following a single molding operation. A single semi-permanent mold release agent application can be used to facilitate the release of multiple successive composite molded parts without reapplication of the release agent; e.g. up to 2, 3, 4, 5, 6, 7, 8, 9, or 10, or more releases from a single mold release agent application. U.S. Pat. No. 5,601,641 (incorporated herein by reference) describes one type of semi-permanent mold release agent that has 0.1 to 12% silane, 0 to 16% methyl terminated polydimethylsiloxane emulsified polymer, 0 to 10% non-ionic surfactant, 0 to 8% fluorinated alkyl ester surfactant, 0 to 2.5% ethoxylated amine surfactant, 0 to 12.5% silanol terminated polydimethylsiloxane having a weight average molecular weight of 400 to 310,000, 0.1 to 8% lower alkyl alcohol wherein the alkyl has 1-3 carbon atoms, 0 to 2% fungicide, 0 to 20% metallic salt of an organic acid, 0.5 to 2% weak acid to maintain the pH between 4.5-5.5, 0.1 to 15% hydroxyl terminated polybutadiene, and 40 to 97% water. U.S. Pat. Nos. 5,298,556 and 5,219,925 are in the same patent family as the '641 patent mentioned above, and are also incorporated herein by reference.

U.S. Pat. No. 6,322,850, incorporated herein by reference, describes a similar semi-permanent mold release agent, wherein the silane component is present in a concentration of 0.5 to 12 percent by weight and is selected from the following group of 7 specific silanes and mixtures thereof dimethyldiethoxysilane, methyldiethoxysilane, dimethyldimethoxysilane, diphenyldimethoxysilane, trimethylmethoxysilane, trimethylethoxysilane, and aminopropyltriethoxysilane. The composition also includes a multi-functional polydimethyl siloxane emulsified polymer and a compatible surfactant, together with about 0.1 to 30% by weight of ethanol, remainder water.

The mold release agents described in the above patents are applied and cured at high temperature (e.g. mold temperature of 350° F.). When these release agents are applied at room temperature, they not only provide poor release due to insufficient cure at room temperature, but they can also result in detrimental transfer of the mold release agent to finished composite parts. Also, the above-described release agents do not provide uniform mold surface coverage when applied to the mold surface at ambient temperature (e.g. 25° C.).

U.S. Pat. No. 5,399,310, incorporated herein by reference, describes another mold release agent comprising an oligomeric salt agent and a diluent, where the oligomeric salt agent is a lithium, sodium, or potassium salt, or mixture thereof, of an oligomer of monomeric units or mixture of the said oligomers, wherein the monomeric units are selected from the group consisting of $C_{14}$ to $C_{24}$ carboxylic fatty acids. This mold release agent is not beneficially used to release molded composite parts due to interactions between the fatty acid monomeric units and the composite material. Also, this release agent results in significant detrimental transfer to the finished molded parts which interferes with or inhibits effective post bonding. Also, this mold release agent is not suitable for high temperature molding (such as composite molding) because the fatty acid monomeric units will liquefy or decompose at or above about 180° C.

It is highly preferred that mold release agents used for molding composite parts are room temperature curable, especially in aerospace applications, because the molds are prepared at room temperature as explained above. After the mold has been prepared (including provision of the mold release agent and the prepreg resin composite), the mold is heated to elevated temperature, often in a separate oven, typically above 180° C., to cure the resin and form the finished composite part.

Up till now, room temperature curing semi-permanent mold release agents with high thermal stability have been solvent based; meaning they contain significant amounts of volatile organic compounds (VOCs), and have relatively low flash points and high vapor pressures. Examples include the Frekote™ mentioned above and other existing or conventional solvent-based mold release agents. These existing solvent based mold release agents present significant health and safety hazards, both in use and transport.

Accordingly, there is a need in the art for a non-solvent based, thermally stable, semi-permanent mold release agent that provides effective mold release of multiple successive molded composite parts following a single initial application to the mold surface. Preferably, such a mold release agent also will result in no or substantially no detrimental transfer of the mold release agent to the surface of the finished composite part, meaning that the mold release agent will not result in any (or significant) residue on the surface of the composite part that will detrimentally affect adhesive bonding to that surface.

SUMMARY OF THE INVENTION

A mold release agent is provided. The mold release agent comprises a functional siloxane, a crosslinker, a thickening agent, a base, and water. The functional siloxane is dispersed in water.

Another mold release agent is provided that comprises a functional siloxane, a crosslinker, a thickening agent, a base, a surfactant, and water. The functional siloxane is dispersed in water, and the mold release agent has a shelf life greater than five months at about 25° C.

Another mold release agent is also provided that comprises a functional siloxane, a crosslinker, a thickening agent, a base, a surfactant, and water. The functional siloxane is dispersed in water, and the mold release agent has an initial viscosity of 10-10,000 cP at 25° C.

A method of preparing a water based mold release agent for molded composite parts is also provided. The method includes the steps of: a) providing a Part 1 composition that has 0.01-10 weight percent functional siloxane, 0.1-10 weight percent crosslinker, 0.01-10 weight percent surfactant and water; b) providing a Part 2 composition that has 1-25 weight percent catalyst and 20-80 weight percent thickening agent; c) providing a Part 3 composition that has a base; and d) blending the Part 1, Part 2, and Part 3 compositions together to provide the mold release agent. The base is effective to adjust the pH of the mold release agent to 7-11 to thereby activate the thickening agent to provide the mold release agent with an initial viscosity of 10-10,000 cP at 25° C.

A method of molding a composite part is also provided which includes the following steps: a) providing a mold surface; b) providing a mold release agent that includes a functional siloxane, a crosslinker, a thickening agent, a surfactant, a base, and water, wherein the functional siloxane is dispersed in water; c) applying a coating of the mold release agent via wiping or spraying to the mold surface; and d) allowing the coating to dry for a period of time.

A water based mold release agent is also provided that is made by a method including the following steps: a) providing a Part 1 composition that has 0.01-10 weight percent functional siloxane, 0.1-10 weight percent crosslinker, 0.01-10 weight percent surfactant, and water, b) providing a Part 2 composition that has 1-25 weight percent catalyst, and 20-80 weight percent thickening agent; c) providing a Part 3 composition that has a base; and d) blending the Part 1, Part 2, and Part 3 compositions together to provide the mold release agent. The base is effective to adjust the pH of the mold release agent to 7-11 to thereby activate the thickening agent to provide the mold release agent with an initial viscosity of 10-10,000 cP at 25° C.

DETAILED DESCRIPTION OF THE PREFERRED EMBODIMENTS OF THE INVENTION

As used herein, when a range is given such as 5-25, that means preferably at least 5, and separately and independently, preferably not more than 25. As used herein, the term solvent refers to organic solvents. Also as used herein, the terms functional siloxane and functionalized siloxane are used synonymously to refer to a siloxane that has been functionalized by appropriate substitution or addition of a functional group to at least one Si atom of the siloxane chain, which functional group is capable of or effective to facilitate crosslinking the siloxane chain in a crosslinking reaction as known in the art. Unless otherwise explicitly indicated, all percents are weight percents.

A room temperature curable water based mold release agent for molded composites is provided. The composition of the invented mold release agent is best understood from a description of the preferred method of preparing it. The invented mold release agent is prepared by blending three component Parts which are preferably prepared separately. Table 1 below discloses the preferred compositions of the three Parts which are subsequently blended to provide the invented mold release agent. In Table 1, all values are weight percents, and all weight percents are with respect to the total weight of each Part; (i.e. 0.05-3 weight percent functional siloxane in Table 1 means 0.05-3 weight percent of the Part 1 composition. For each Part, any less preferred or more preferred concentration or range for any one component can be combined with any less preferred or more preferred concentration or range of any of the other components; it is not required that all of the concentrations or ranges for all of the components come from the same column.

TABLE 1

| Composition of water based mold release agent for molding composites | | | |
|---|---|---|---|
| Component | Preferred | Less Preferred | Less Preferred |
| Part 1 | | | |
| Functional siloxane | 0.05-3 | 0.04-3.5 | 0.02-5.5 |
|  | 0.04-3.2 | 0.03-4 | 0.02-6 |
|  |  | 0.03-4.5 | 0.01-10 |
| Crosslinker | 0.2-5 | 0.18-5.5 | 0.12-7 |
|  | 0.18-5.2 | 0.16-6 | 0.1-7.5 |
|  |  | 0.14-6.5 | 0.1-10 |

TABLE 1-continued

Composition of water based mold release agent for molding composites

| Component | Preferred | Less Preferred | Less Preferred |
|---|---|---|---|
| Surfactant | 0.01-2 | 0.008-2.4 | 0.006-3 |
| | 0.01-2.2 | 0.008-2.6 | 0.004-3.2 |
| | | 0.006-2.8 | 0.002-3.5 |
| Slip Agent | 0-20 | | |
| Water | | Balance | |
| Part 2 | | | |
| Catalyst | 7.5-15 | 6-17 | 3-20 |
| | 7-16 | 5-18 | 2-22 |
| | | 4-19 | 1-25 |
| Transfer control reagent | 20-30 | 16-34 | 10-40 |
| | 18-32 | 14-36 | 8-42 |
| | | 12-38 | 0-45 |
| Wetting agent | 10-25 | 8-28 | 5-34 |
| | 9-26 | 7-30 | 4-36 |
| | | 6-32 | 0-38 |
| Thickening agent | 40-60 | 36-64 | 30-70 |
| | 38-62 | 34-66 | 25-75 |
| | | 32-68 | 20-80 |
| Color dye | 0-10 | | |
| Part 3 | | | |
| Base | | 100 | |

Parts 1-3 from Table 1 will now be described. Part 1 is a blended siloxane emulsion. The functional siloxane is preferably silanol-functional, less preferably vinyl-, alkoxy, hydride-, or carboxy-functional, or any combination thereof. The functional siloxane may be one or more of following structural formula:

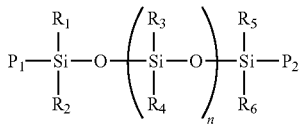

where $R_1$, $R_2$, $R_3$, $R_4$, $R_5$ and $R_6$ individually can be the same or different and may be $C_{1-3}$ alkyl, vinyl, hydride, or alkoxy, and n is about 0 to about 100,000; $P_1$ and $P_2$ can be the same or different and can be silanol, hydride, alkyl, vinyl, carbinol or carboxy groups. Interruption of the polymer chain by a hetero-atom is also within the scope of the present invention.

Preferably, the functional siloxanes used herein are bi-functional siloxanes, meaning that they have two functional groups attached or bonded to different (or the same) silicon atom(s) in the siloxane chain. Terminally bi-functional siloxanes (those having a functional group attached to each of the two terminal silicon atoms in the siloxane chain) are preferred in the invention because they are widely available; however, it is not required that the bi-functional siloxanes be terminally bi-functional. Multi-functional siloxanes (having 3 or more functional groups bonded to Si atoms in the chain) can also be used. The siloxane used herein is preferably dimethyl siloxane, less preferably vinyl siloxane, less preferably methyl siloxane, or mixtures thereof.

The remainder of the description is provided with respect to bi-silanol-functional siloxanes which are most preferred; however it will be understood that other functional siloxanes, including those described above, can be used in the present invention, and a person of ordinary skill in the art will be able to adapt the following description for use of other functional siloxanes when they are used instead of silanol-functional siloxane.

The silanol-functional siloxane is preferably a substantially straight-chain or linear dimethyl siloxane, preferably having a functional silanol (Si—OH) group at each of its terminal ends (i.e. it is terminally bi-functional). The structure of the preferred silanol-functional siloxane is $HO(CH_3)_2$—Si—(O—Si$(CH_3)_2$—O—Si$(CH_3)_2)_x$—O—Si$(CH_3)_2OH$. Preferably, x is chosen so the siloxane has a molecular weight in the range of 500-1,000,000, preferably, 1,000-800,000, preferably 10,000-500,000, preferably 15,000-300,000, preferably 18,000-200,000, preferably 20,000-100,000. In a useful embodiment of the invention, x is selected to provide siloxanes having a molecular weight in the range of 4,000-100,000. Less preferably, the silanol-functional siloxane can be branched.

Also less preferably, the siloxane can be mono-functional as opposed to bi-functional; that is, it can have only one Si—OH functional group, e.g. at one terminus, with the other terminus being nonfunctional e.g. Si—$(CH_3)_3$. Mono-functional siloxanes are strongly less preferred because they are not effectively crosslinked due to their having only a single functional group. The result of crosslinking a mono-functional siloxane would be a plurality of largely linear, discrete molecules rather than the multi-dimensional crosslinked molecular cage or matrix that results from the strongly preferred bi-functional species described above.

The crosslinker facilitates cross-linking of the mold release agent on the mold surface during cure to produce a semi-permanent release film on the mold surface. The crosslinking agent preferably is a functional silane having the general formula X-SiABC, where X is a methyl, alkoxy, vinyl, acetoxy, hydride or ethyl group, preferably a methyl or a vinyl group; and A, B, and C individually can be the same or different from one another, each being a methoxy, ethoxy, propoxy, acetoxy, methyl, vinyl, or ethyl group, preferably an ethoxy group. Preferably, the crosslinker is a tetra- or a tri-functional crosslinking agent such as tetra-alkoxy or tri-alkoxy functional silane, less preferably a bi-functional agent such as bi-alkoxy functional silane. For example, a tetra-alkoxy functional silane having four ethoxy functional groups can be provided from the general formula above by selecting ethoxy for X, and ethoxy for all three of A, B and C. Whereas a tri-alkoxy functional silane having three ethoxy functional groups and one methyl non-functional group can be provided by selecting methyl for X and ethoxy for all three of A, B and C. Combinations of tetra-, tri- and bi-functional silanes are also preferred. In general, the size and electronegativity of the functional groups determine the curing speed of the mold release agent. A methoxy functional group is preferred for A, B and/or C for faster hydrolysis speed. However, ethoxy is generally preferred for two reasons. First, the byproduct of the crosslinking reaction is ethanol when the functional group is ethoxy, whereas methanol results when the functional group is methoxy. Ethanol can be disposed of cheaply and easily, while methanol is highly toxic and heavily regulated making its disposal significantly more costly. Second, the ethoxy hydrolysis and condensation reactions proceed at a more favorable rate than the corresponding methoxy hydrolysis and condensation reactions once the mold release agent is applied to the mold surface.

Less preferably, longer-chain alkyl groups can be used for X and/or A, B and C, which will slow the crosslinking reaction. Less preferably, the crosslinker can be or include MQ resins, silicates, and/or alkoxy-, hydro-, and vinyl-silanes, or mixtures thereof. It is to be noted that the relative concentrations of crosslinker and functional siloxane in Part 1 must be carefully controlled so as not to provide substantial excess of one or the other; too much functional siloxane, and the uncrosslinked excess can be detrimentally transferred to the molded composite part surface and interfere with adhesive bonding (described below). Too much crosslinker may result in difficult release of molded composite parts from the mold surface. It is generally preferred to provide a balanced excess (such as >0.1% excess) of the crosslinker to ensure sufficient crosslinking of the siloxanes in the mold release agent in order to prevent detrimental transfer of siloxanes to molded composite parts (described below).

The surfactant in Part 1 is preferably a mixture of surfactants including but not limited to one diphenyl sulfonate or a derivative thereof, one silicone based surfactant, and one ethoxylated alkylphenol.

In Part 2, the catalyst is an organo-tin or an organo-titanium or any other catalyst that is effective to accelerate or promote curing of the mold release agent (i.e. crosslinking of the siloxane from Part 1) at ambient temperature, preferably 5-70, preferably 10-55, preferably 15-45, preferably 20-35, preferably 22-30, preferably about 25° C. Preferably, the catalyst is an emulsion (or aqueous solution) type catalyst meaning that the catalyst is provided with the catalytic solids emulsified and stable in a water carrier phase. Emulsion type catalysts are more effectively blended with the other components (including those from Parts 1 and 3) to provide the invented mold release agent. Preferably, the catalyst includes organo-tin compounds, organo-titanium compounds, or a mixture thereof. Emulsified organo-tin and organo-titanium based catalysts are known in the art, and are available, e.g., from Dow Chemical Company, E.I. DuPont de Nemours, Inc., and Hanse Chemie.

The transfer control reagent is an optional component that is added to limit or minimize detrimental transfer of the mold release agent from the mold surface to finished molded composite parts. A suitable transfer control reagent is an alkyl-functional siloxane emulsion having 50% active ingredients (solids). The alkyl group is preferably an aliphatic carbon chain having a length of 1 to 18 carbon atoms, generally the larger the number of carbon atoms the better. Preferably, an aromatic moiety such as 2-phenylpropyl is also attached.

The wetting agent is preferably a super wetting agent as known in the art, such as a trisiloxane based surfactant, less preferably a fluoro based surfactant. The wetting agent is effective to promote effective wetting of a mold surface with the invented mold release agent when applied thereto, e.g. via wiping, less preferably spraying. In one embodiment of the invention, the surfactant component of the Part 1 composition from table 1 (used to emulsify the crosslinker) can also serve as a wetting agent. In this embodiment, no additional or separate wetting agent component from the surfactant component listed in table 1 may be required.

The thickening agent is preferably Ucar™ available from Dow Chemical Company. Less preferably, other known or conventional thickening agents can be used; e.g. Cab-o-Sil® from Cabot Corporation, Methocel™ family of thickening agents from Dow Chemical Company, and Class™ from The Procter & Gamble Company. The thickening agent is provided to increase the viscosity of the invented water based mold release agent as will be further described below.

A commonly available slip agent can be used to achieve better release performance. Any known or conventional slip agent can be used, including but no limited to functional and non-functional siloxanes, partially fluorinated siloxanes, and fluorinated hydrocarbons. The presence and/or amount of slip agent can be selected or determined within the specified range by a person of ordinary skill in the art based on the desired or observed release performance for a particular application.

A color indicator or dye also can be added to the invented mold release agent. The function of a color indicator is to show the proper coverage of the mold release agent on the mold surface when required or beneficial to visualize coverage of the mold surface. Generally, the selected color indicator is stable in water-based media and chemically compatible with other ingredients in the release agent. The preferred color indicator is selected so that no contaminating transfer of the dye to the molded part will occur.

Part 3 preferably consists of a base that is effective to adjust the pH of the invented mold release agent in the range of 7-11, preferably 8-10 in order to activate the thickening agent as further described below. The base is preferably an organic amine base, preferably ethanolamine.

Parts 1, 2 and 3 as described above are first separately prepared, and then subsequently blended at room temperature, preferably 0-40, preferably 10-35, preferably 15-30, preferably 20-27, ° C., in the proportions provided below in Table 2 to provide the invented water based mold release agent. In Table 2, all values are weight percents, and any less preferred or more preferred concentration or range for any Part can be combined with any less preferred or more preferred concentration or range for any of the other Parts; it is not required that all of the concentrations or ranges for all of Parts 1, 2 and 3 come from the same column.

TABLE 2

| | Blending proportions of Parts 1, 2 and 3 to provide water based mold release agent | | |
|---|---|---|---|
| Part# | Preferred | Less Preferred | Less Preferred |
| Part 1 | 90-99.5 | 89-99.5 | 82-99.8 |
| | | 86-99.6 | 81-99.9 |
| | | 84-99.7 | 80-99.9 |
| Part 2 | 0.1-8 | 0.09-8.2 | 0.06-9 |
| | | 0.08-8.4 | 0.05-10 |
| | | 0.07-8.6 | 0.02-14 |
| Part 3 | 0.1-2 | 0.09-2.2 | 0.06-2.8 |
| | | 0.08-2.4 | 0.05-3 |
| | | 0.07-2.6 | 0.02-4 |
| Total | | 100 | |

As Parts 1, 2 and 3 are blended or mixed, the emulsion pH is raised using a commonly available water soluble base such as ethanolamine, which activates the thickener and raises the viscosity of the mold release agent. The invented mold release agent preferably has an initial viscosity of 10-10,000, preferably 25-5,000, preferably 50-2,000, cP at 25° C., i.e. before any water has evaporated therefrom. Without wishing to be bound by a particular theory, it is believed that the high solution viscosity of the invented mold release agent inhibits or substantially inhibits contact between catalyst molecules, functional siloxane molecules and crosslinker molecules in the composition, which in turn prevents or delays or substantially prevents or delays crosslinking of the mold release agent. This is achieved through high solution viscosity because individual eddies in the composition move very slowly relative to one another, and hence the frequency or occurrence of collisions between catalyst and siloxane molecules is minimized. This promotes longer shelf life for the invented water based mold release agent. Shelf life of greater than five months has been observed for the invented mold release agent when stored at room temperature, e.g. about 25° C.

However, once applied to a mold surface (e.g. via wiping or spraying), the water begins to evaporate. As the water evaporates, catalyst and siloxane molecules in the composition are brought closer together (coalesce) due to the depletion of the carrier (water) volume. As the relative proximity of siloxane and catalyst molecules increases, the frequency of molecular collisions and interaction increases causing a more rapid siloxane coalescence cascade due to cross-linking of siloxane molecules as will be understood by a person of ordinary skill in the art. This evaporative coalescence effect essentially activates the crosslinking cascade for the siloxane molecules to provide the desired siloxane-molecular matrix adjacent and adhered to the mold surface.

Most preferably, the Parts 1, 2 and 3 from Table 1 supra are blended according to the preferred proportions listed in Table 2 above, to provide a room temperature curable, thermally stable, water-based mold release agent according to the invention, preferably having a final composition as listed below in Table 3.

TABLE 3

Preferred composition of room temperature curable, thermally stable, water-based mold release agent for de-molding composite parts

| Component | Preferred | Less Preferred | Less Preferred |
|---|---|---|---|
| Silanol-functional siloxane | 0.04-2.99 | 0.036-3.18 | 0.018-4.5 |
| | | 0.036-3.48 | 0.018-5.5 |
| | | 0.03-3.98 | 0.009-10 |
| Alkoxy-functional crosslinker | 0.18-4.98 | 0.16-5.17 | 0.1-7 |
| | | 0.14-6 | 0.1-7.5 |
| | | 0.13-6.47 | 0.09-10 |
| Surfactant | 0.009-2 | 0.01-2.19 | 0.005-3 |
| | | 0.008-2.4 | 0.003-3.2 |
| | | 0.007-2.6 | 0.0018-3.5 |
| Catalyst | 0.007-1.2 | 0.007-1.3 | 0.003-1.6 |
| | | 0.006-1.36 | 0.002-1.8 |
| | | 0.005-1.44 | 0.001-2 |
| Alkyl functional siloxane emulsion | 0.02-2.4 | 0.018-2.56 | 0.01-3.2 |
| | | 0.016-2.7 | 0.008-3.36 |
| | | 0.014-2.9 | 0-3.6 |
| Wetting agent | 0.01-2 | 0.009-2.1 | 0.005-2.7 |
| | | 0.008-2.24 | 0.004-2.9 |
| | | 0.007-2.4 | 0.003-3.1 |
| Thickening agent | 0.04-4.8 | 0.04-4.96 | 0.03-5.6 |
| | | 0.036-5.1 | 0.02-6 |
| | | 0.034-5.3 | 0.02-6.4 |
| Base | 0.1-2 | 0.09-2.2 | 0.06-2.8 |
| | | 0.08-2.4 | 0.05-3 |
| | | 0.07-2.6 | 0.04-4 |
| Slip Agent | 0-20 | | |
| Color dye | 0-10 | | |
| Water | | Balance | |

In practice, the invented mold release agent is preferably applied to a mold surface via wiping or spraying as known or conventional in the art. For initial application, the mold surface is preferably cleaned or polished thoroughly, and dried via conventional techniques. Then, a coating of the invented mold release agent is applied, preferably via wiping or spraying. The coating is allowed to dry for a period of time, preferably about 15 minutes, and an additional coating applied. This procedure is repeated until preferably at least 2, preferably 3, preferably 4, coats have been applied. It has been found that the water substantially completely evaporates from the mold surface under ambient temperature conditions (22-27, preferably about 25° C.) within 10-30 minutes without the addition of a volatilizer such as alcohol. When used for releasing molded epoxy based resin parts, sufficient curing (i.e. siloxane crosslinking) of the release agent necessary to ensure adequate epoxy resin part release is achieved in less than 5, preferably less than 4, preferably less than 3, hours at ambient temperature (22-27, preferably about 25° C.) following application of the final coat. When used for polyester based resin parts, the required cure time for the release agent is significantly decreased to less than 1 hour, preferably less than 40 minutes, preferably less than 30 minutes at ambient temperature (22-27° C.).

The invented mold release agent has no flash point and is not flammable or combustible. The mold release agent is devoid or substantially devoid of VOCs, preferably containing less than 5, 4, 3, or 2, grams of VOCs per liter of the mold release agent. Therefore, the invented water based mold release agent does not present any significant health or safety hazards either in use or in transport. For example, the invented water based mold release agent preferably can be shipped via standard carriers or even by mail without the necessity of arranging special shipping due to the presence of dangerous VOCs or other dangerous properties, such as toxicity, high flammability, and low flash point which are characteristic of solvent based mold release agents.

The invented mold release agent provides effective release of multiple successive composite molded parts following a single initial application of the mold release agent. Depending on prevailing conditions, it may be desirable to apply a touch-up coat of the mold release agent following a certain number of molding operations; e.g. after 1, 2, 3, 4, 5, 6, 7, 8, 9, or more, consecutive releases.

The invented water based mold release agent has also been shown to result in no or substantially no detrimental transfer of the mold release agent to the surface of composite molded parts. Detrimental transfer is defined herein to mean any transfer of the mold release agent or mold release agent components that causes a detrimental effect on subsequent adhesive bonding (post bonding) of the composite part to another composite part or other surface.

EXAMPLE

A test was performed to measure the degree of detrimental transfer of mold release agent to composite surfaces molded and released using the invented mold release agent. Five sheets of prepreg fiber-mats or plies were laid and molded on a mold surface that had been previously coated with the invented mold release agent at room temperature as described above. The resulting molded composite was then adhered to the surface of another composite part using Hysol EA 9695 adhesive as known in the art. The bond thickness was 5 mils. The bond strength was measured using an Instron machine. Bond tensile strength and failure mode were each noted and recorded and are provided below in Table 4.

TABLE 4

Experimental post-bond adhesive failure mode data for adhered composite parts demolded using the mold release agent according to the invention

| Period of storage of mold release agent (days) | Tensile bond strength (psi) | Failure mode |
|---|---|---|
| 0* | 1275 | Cohesive |
| 9 | 1331 | Cohesive |
| 36 | 1398 | Cohesive |
| 45 | 1605 | Cohesive |
| 54 | 1070 | Cohesive |
| 63 | 1606 | Cohesive |
| 72 | 1574 | Cohesive |
| 99 | 1063 | Cohesive |

TABLE 4-continued

Experimental post-bond adhesive failure mode data for adhered composite parts demolded using the mold release agent according to the invention

| Period of storage of mold release agent (days) | Tensile bond strength (psi) | Failure mode |
|---|---|---|
| 130 | 1551 | Cohesive |
| 150 | 1135 | Cohesive |

*Zero-day storage test was a control, where the surfaces of both adhered parts were light sanded to eliminate any possibility of detrimental transfer of the mold release agent From Table 4, the invented mold release agent resulted in adhesive bond tensile strength comparable to that of the control, and the composite exhibited cohesive failure for mold release agent having a shelf life from 9-150 days. Cohesive failure (as opposed to adhesive failure) means that the composite part itself broke or snapped; i.e. the adhesive bond remained intact in all tests. This test demonstrated that the mold release agent (even after 150 days of shelf life) did not result in any measurable detrimental transfer of the invented mold release agent to molded composite surfaces. This was a highly surprising result. In addition, all composite parts tested in Table 4 exhibited high quality mold release with no damage or blemishing to either the mold surface or the composite part for all periods of shelf life storage of the mold release agent.

The water based mold release agent according to the invention has been shown to provide excellent mold release for both Prepreg and Synskin molded composite parts at ambient temperatures following room temperature curing of the mold release agent with no extrinsic curing accelerants (such as co-solvent, UV or heat) being used. The water based mold release agent according to the invention has also shown to provide excellent mold release for all types of polyester resin composite parts (gelcoat, non-gelcoat) at ambient temperature following ambient temperature curing of the mold release agent without any curing accelerants (heat, co-solvent, UV) being used. The invented mold release agent also has demonstrated good release performance for other commonly molded polymer materials, such as polyethylene, polypropylene, polycarbonate, hotmelt, and rubber.

The invented mold release agent is room temperature curable (e.g. at 22-27, preferably about 25° C.), is thermally stable up to at least 200° C., preferably at least 250° C., preferably at least 300° C., for a period of at least 3, preferably 5, preferably 7, preferably 10, 20, 30, 45 or 60, days. The mold release agent also facilitates effective release of multiple successive molded composite parts following a single initial application to the mold surface. The invented mold release agent also results in no or substantially no detrimental transfer of the mold release agent to the surface of finished molded composite parts.

From the above, it will be clear that the mold release agent according to the invention is curable at room temperature, yet contains no VOCs or any organic carriers and can be used to demold composite parts (such as epoxy and polyester resin parts) that are cured at any commonly used molding temperatures, for example at considerably elevated temperatures, up to 200 or 300 or even 400, degrees C. However, it should be noted that the invented mold release agent also can be cured at high temperatures if desired, and also can be used to demold room temperature or low temperature cured molded parts such as gelcoat parts which are made from polyester, polystyrene, epoxy, or a mixture of these. Other molded parts for which the invented mold release agent can be used include polyethylene, polypropylene, and polycarbonate parts. The mold release agent according to the invention is particularly useful in applications where the mold is prepped at low temperatures, such as less than 100° C. or 80° C., and particularly at room temperature (25° C.), yet the molded part (e.g. epoxy) is cured at high temperature, such as 180-280° C. or higher. In these applications, the mold release agent is curable at room temperature, yet remains thermally stable up to the curing temperature of the (epoxy) molded part, so that effective mold release can be achieved following part cure.

If the mold release agent is cured at elevated temperatures, it still performs well as described herein, the principal difference being that it cures faster than otherwise described. Conventional water based mold release agents cannot be adequately cured at ambient temperature within a reasonable time so as to provide consistent, effective mold release of multiple successive molded parts, while still ensuring no or substantially no detrimental transfer of the mold release agent to released molded parts.

Although the above described embodiments of the invention constitute the preferred embodiments, it should be understood that modifications can be made thereto without departing from the scope of the invention as set forth in the appended claims.

What is claimed is:

1. A mold release composition having a pH of 7 to 11 prepared from a group of ingredients comprising:
0.009 to 10% by weight of a functional siloxane, having the following structure:

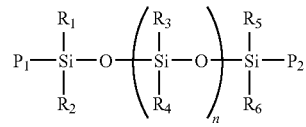

where $R_1$, $R_2$, $R_3$, $R_4$, $R_5$ and $R_6$ individually can be the same or different, each being selected from the group consisting of $C_{1-3}$ alkyl, vinyl, hydride, and alkoxy groups, where n is about 0 to about 100,000, and where $P_1$ and $P_2$ can be the same or different, each being selected from the group consisting of silanol, hydride, hydroxyl, alkyl, vinyl, carbinol and carboxy groups;
0.09 to 10% by weight of a crosslinkert;
0.001 to 2% by weight of a catalyst;
0.02 to 6.4% by weight of a thickening agent; and further comprising 0.04 to 4% by weight of a base additional to each of the functional siloxane, the crosslinker and the thickening agent; and water.

2. A mold release composition according to claim 1, wherein the crosslinker has the general formula X-SiABC where X is selected from the group consisting of methyl, vinyl, alkoxy, acetoxy, hydride and ethyl groups, and A, B and C are each individually an alkoxy group.

3. A mold release composition according to claim 1, having less than 5 grams VOCs per liter of said mold release composition.

4. A mold release composition according to claim 1, further comprising at least one component selected from the group consisting of a wetting agent, a surfactant, a slip agent, a dye and a transfer control agent.

5. A mold release composition according to claim 1, having a viscosity of 10-10,000 cP at 25° C.

6. A mold release composition according to claim 1, said functional siloxane having the following structure: $HO(CH_3)_2$—Si—$(O$—$Si(CH_3)_2$—$O$—$Si(CH_3)_2)_x$—$O$—$Si(CH_3)_2OH$, where x is selected such that said functional siloxane has a molecular weight in the range of 4,000- 100,000.

7. A mold release composition according to claim 1, said mold release composition being curable at room-temperature.

8. A mold release composition according to claim 1, comprising the following composition:
 0.04-2.99 weight percent silanol-functional siloxane;
 0.018-4.98 weight percent alkoxy-functional crosslinker;
 0.009-2 weight percent catalyst;
 0.04-4.8 weight percent thickening agent activatable at a pH of 7 to 11; and
 0.1-2 weight percent base.

9. A mold release composition according to claim 1, wherein at least one of $P_1$ and $P_2$ is hydroxyl.

10. A mold release composition according to claim 1 wherein the crosslinker is selected from a tri-alkoxy functional silane and a tetra-alkoxy functional silane.

11. A mold release composition according to claim 1, having a shelf life of greater than five months at about 25° C.

12. A mold release composition according to claim 1, wherein the thickening agent is activatable at a pH of 7 to 11, the activated thickening agent providing the mold release composition with a viscosity of 10-10,000 cP at 25° C.

13. The mold release composition according to claim 1 wherein the base is a separate component from the functional siloxane, the crosslinker and the thickening agent.

14. The mold release composition according to claim 1 wherein cured products of the mold release composition have substantially no detrimental transfer to the surface of a composite molded part.

15. A mold release composition prepared from at least:
 0.04 to 3 percent by weight of a functional siloxane, having the following structure,

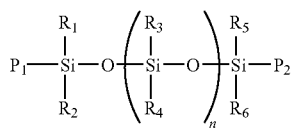

where $R_1$, $R_2$, $R_3$, $R_4$, $R_5$ and $R_6$ individually can be the same or different, each being selected from the group consisting of $C_{1-3}$ alkyl, vinyl, hydride, and alkoxy groups, where n is about 0 to about 100,000, and where $P_1$, and $P_2$ can be the same or different, each being selected from the group consisting of silanol, hydride, hydroxyl, alkyl, vinyl, carbinol and carboxy groups;
 0.18 to 5 percent by weight of a functional crosslinker having the formula X-SiABC where X is selected from the group consisting of methyl, vinyl, alkoxy, acetoxy, hydride and ethyl groups, and A, B and C are each individually an alkoxy group;
 0.04 to 5 percent by weight of a thickening agent activatable at a pH of 7 to 11, the activated thickening agent providing the mold release composition with a viscosity of 10-10,000 cP at 25° C;
 0.1 to 2 percent by weight of an ethanolamine base additional to the functional siloxane, the crosslinker and the thickening agent;
 optionally, 0.05 to 38 percent by weight of at least one component selected from the group consisting of welling agent, surfactant, slip agent, dye and transfer control agent; and
 water;
wherein the mold release composition has 0 to 1 percent by weight of non-functional siloxanes, a pH of 7 to 11 and a shelf life of greater than five months at about 25° C.

16. A mold release composition prepared from a group of ingredients consisting essentially of:
 0.009 to 10% by weight of a functional siloxane, having the following structure,

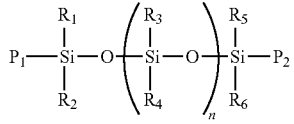

where $R_1$, $R_2$, $R_3$, $R_4$, $R_5$ and $R_6$ individually can be the same or different, each being selected from the group consisting of $C_{1-3}$ alkyl, vinyl, hydride, and alkoxy groups, where n is about 0 to about 100,000, and where $P_1$ and $P_2$ can be the same or different, each being selected from the group consisting of silanol, hydride, hydroxyl, alkyl, vinyl, carbinol and carboxy groups;
 0.09 to 10% by weight of a functional crosslinker having the formula X-SiABC where X is selected from the group consisting of methyl, vinyl, alkoxy, acetoxy, hydride and ethyl groups, and A, B and C are each individually an alkoxy group;
 0.02 to 6.4% by weight of a thickening agent activatable at a pH of 7 to 11, the activated thickening agent providing the mold release composition with a viscosity of 10-10,000 cP at 25° C; 0.04 to 4% by weight of a base additional to the functional siloxane, the crosslinker and the thickening agent;
 0.001 to 2% by weight of catalyst; water and
 optionally at least one component selected from the group consisting of wetting agent, surfactant, slip agent, dye and transfer control agent;
wherein the mold release composition has a pH of 7 to 11 and a shelf life of greater than five months at about 25° C.

17. A mold release composition according to claim 16, wherein the mixture is:
 0.04-2.99 weight percent functional siloxane;
 0.018-4.98 weight percent functional crosslinker;
 0.009-2 weight percent catalyst;
 0.04-4.8 weight percent thickening agent;
 0.1-2 weight percent of an amine base;
 optionally 0.04-36.4 weight percent of the at least one component; and
 water.

18. A mold release composition according to claim 16, wherein the mixture consists of the functional siloxane; the functional crosslinker; the catalyst; the thickening agent; the base; the water and optionally the at least one component.

* * * * *